United States Patent

Brooks et al.

[11] Patent Number: 5,841,112
[45] Date of Patent: Nov. 24, 1998

[54] DIAGNOSTIC DISPLAY METHOD FOR ELECTRONIC COOKING APPLIANCE CONTROL

[75] Inventors: Timothy L. Brooks, Carlisle; Thomas Lee Aukerman, Huber Heights, both of Ohio

[73] Assignee: Whirlpool Corporation, Benton Harbor, Mich.

[21] Appl. No.: 832,258

[22] Filed: Apr. 3, 1997

[51] Int. Cl.$^6$ .................................................. H05B 1/02
[52] U.S. Cl. .................... 219/506; 219/487; 219/483; 219/413; 219/508; 364/551.01; 340/660; 340/870.16
[58] Field of Search ................ 219/411–414, 501, 219/508, 481, 483, 485, 486, 497, 494, 487; 364/580, 551.01; 340/660, 461, 959, 438, 870.17, 870.16

[56] References Cited

U.S. PATENT DOCUMENTS

| | | | |
|---|---|---|---|
| 4,245,309 | 1/1981 | Kiefer | 364/400 |
| 4,634,842 | 1/1987 | Payne | 219/486 |
| 4,636,949 | 1/1987 | Longabaugh | 364/400 |
| 4,935,607 | 6/1990 | Kadwell et al. | 219/508 |
| 4,977,394 | 12/1990 | Manson et al. | 340/679 |
| 5,345,495 | 9/1994 | Black et al. | 379/29 |
| 5,453,939 | 9/1995 | Hoffman et al. | 364/551.01 |
| 5,482,013 | 1/1996 | Andrews et al. | 123/179.21 |
| 5,702,624 | 12/1997 | Liao et al. | 219/497 |

*Primary Examiner*—Mark H. Paschall
*Attorney, Agent, or Firm*—Robert O. Rice; Thomas A. Schwyn

[57] ABSTRACT

A cooktop service diagnostics method which is effected by a programmable controller system, wherein the programmable controller system: a) executes a routine upon receipt of a first specified pattern of input signals to the programmable controller: b) issues an activation audible signal to indicate receipt of the specified pattern of input signals; c) issues an activation visual signal to indicate receipt of the specified pattern of input signals; d) tests cooktop heating element drivers for malfunction conditions; e) tests cooktop controller input drivers for malfunction conditions; f) issues a malfunction visual signal to indicate the existence and type of any malfunction condition; g) terminates the routine upon the receipt of a second specified pattern of input signals to the programmable controller; h) issues a deactivation visual signal to indicate termination of the routine; and i) issues a deactivation audible signal to indicate termination of the routine.

34 Claims, 7 Drawing Sheets

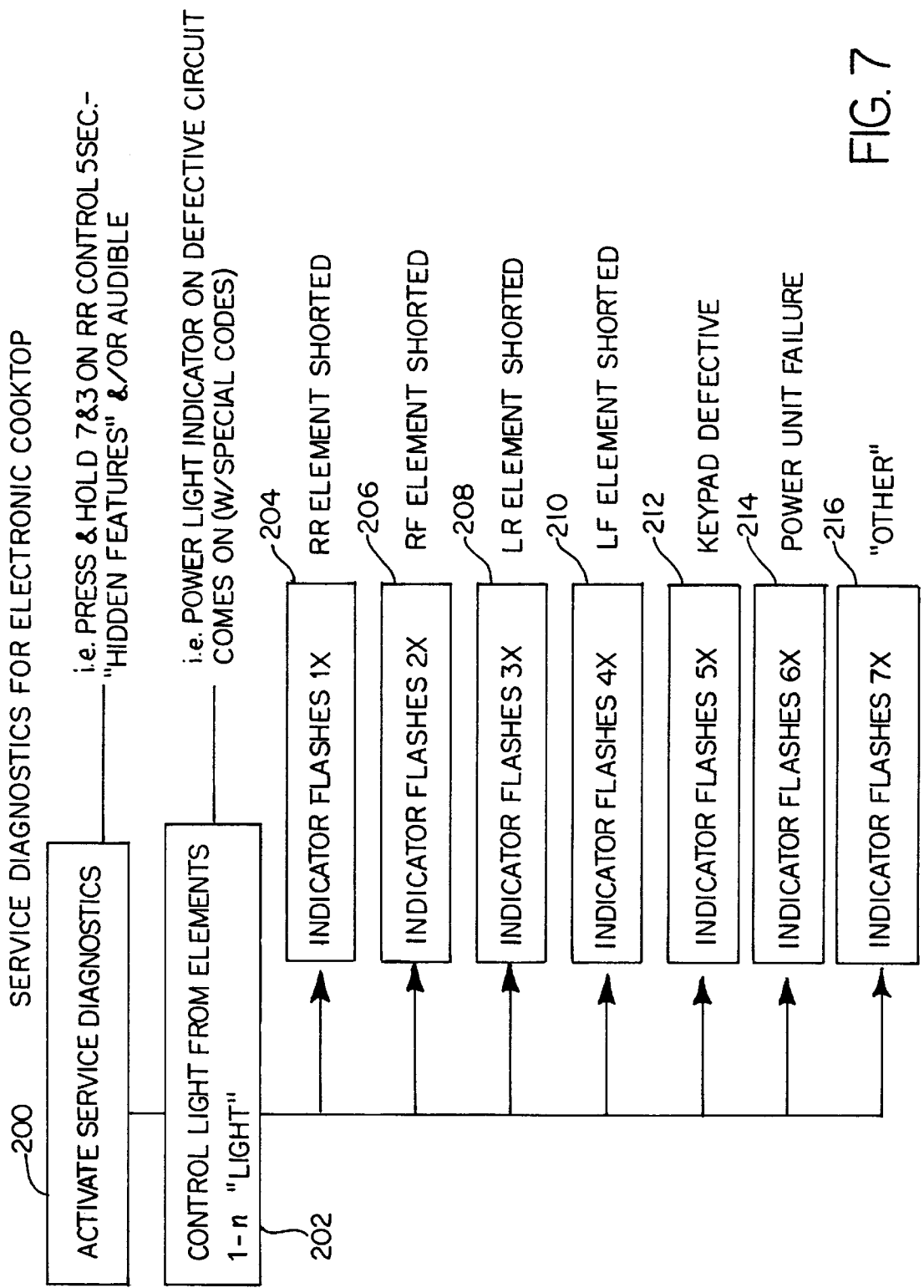

DIAGNOSTIC DISPLAY METHOD FOR ELECTRONIC COOKING APPLIANCE CONTROL

BACKGROUND OF THE INVENTION

The present invention generally relates to appliances. More particularly, the invention relates to a diagnostic system for an appliance. Yet more specifically, the invention relates to a service diagnostic system.

There is always the possibility that an appliance may malfunction during use during its lifetime. The malfunction may be minor or major. A minor malfunction is likely to be easily rectified, many times by persons not skilled in the repair of appliances, as only minor adjustments to the appliance may be required. Further, in certain instances, the appliance may continue to operated unimpeded despite the minor malfunction. On the other hand, it is likely that a major malfunction can only be rectified by someone skilled in the repair of that particular appliance in that a major malfunction will force operation of the appliance to discontinue.

A diagnostic system is a system designed to implement a diagnostic routine, wherein a series of steps are undertaken to locate and identify a malfunction. Typically, in computer-based diagnostic systems, a program is executed and a series of electronic elements are queried by the system to determine if any is exhibiting a state of malfunction. The electronic elements can include sensors and/or elements, such as portions of a computer.

Diagnostic systems are particularly useful for service personnel who can query an appliance by appropriate selection of switches already included in or on the appliance. Some diagnostic systems include memories for recording data so that the service personnel can retrieve the data thereby to have more information for evaluating a malfunction. The data can be used to more easily identify the location of a malfunction and/or the cause of the malfunction.

Two patents in this area are U.S. Pat. Nos. 4,977,394 and 4,634,842, the disclosures of which are incorporated herein by reference.

U.S. Pat. No. 4,977,394 discloses an automatic appliance including a diagnostic system, wherein a user is alerted to request servicing for major operational errors, and error data is stored for later retrieval by service personnel. A special overlay template is provided for the service personnel to execute special routines via standard operational parameter input keypads of the appliance.

U.S. Pat. No. 4,634,842 discloses a power control and diagnostic arrangement embodied in an electric range having multiple surface heating units which are selectively coupled to an AC power supply by commutated relay switching circuitry. The commutated relay switching circuitry includes two switching networks. Each network includes a diode commutated master relay serially connected to a pair of pilot relays. Each pilot relay is serially connected to one of the surface units. Timing and control circuitry periodically interrupts operation of the power circuit in a normal mode to operate in a diagnostic mode. In the diagnostic mode, the relays are switched in a predetermined sequence to test for a short circuit failure of the master relays or commutated diodes, an open circuit failure of the diodes, an open circuit failure of the master relays, a short circuit failure of the pilot relays and an open circuit failure of any individual pilot relay. Upon detection of a failure of a master relay or diode or a short circuit failure of a pilot relay, the master relay and pilot relays for the switching network containing a failed component are deenergized. A user discernible signal is generated informing the user that a failure has been detected.

SUMMARY OF THE INVENTION

The present invention provides a service diagnostic arrangement, including a service diagnostic method, in which a test can be conducted by a service technician during repair of a unit. The service diagnostic identifies faults associated with the controls of the unit and/or elements controlled by the unit.

In an embodiment, the invention provides a cooktop service diagnostics method which is effected by a programmable controller system, wherein the programmable controller system:

a) executes a routine upon receipt of a first specified pattern of input signals to the programmable controller:

b) issues an activation audible signal to indicate receipt of the specified pattern of input signals;

c) issues an activation visual signal to indicate receipt of the specified pattern of input signals;

d) tests cooktop heating element drivers for malfunction conditions;

e) tests cooktop controller input drivers for malfunction conditions;

f) issues a malfunction visual signal to indicate the existence and type of any malfunction condition;

g) terminates the routine upon the receipt of a second specified pattern of input signals to the programmable controller;

h) issues a deactivation visual signal to indicate termination of the routine; and i) issues a deactivation audible signal to indicate termination of the routine.

In an embodiment, the invention provides a cooktop having at least one heating element with a controller associated therewith, the heating element controller having a plurality of temperature selection keys associated therewith; and the first specified pattern comprises the actuation for a specified time period of two temperature selection keys associated with the heating element.

In an embodiment, the invention provides that the specified time period is at least 5 seconds.

In an embodiment, the invention provides that the second specified pattern comprises the actuation for a predetermined period of two temperature selection keys associated with the heating element.

In an embodiment, the invention provides a predetermined period is at least 5 seconds.

In an embodiment, the invention provides that the first and second patterns of input signals are identical.

In an embodiment, the invention provides that the activation and deactivation audible signals comprise two beeps.

In an embodiment, the invention provides that the heating element controller also includes a visual indicator to indicate that the heating element is on; and the malfunction visual signal comprises a specified flashing of the visual indicator which indicates that the heating element is on, the number of flashes being a code to indicate the type of malfunction encountered during the testing steps.

In an embodiment, the invention provides that the cooktop has a plurality of heating elements with a like plurality of respective heating element controllers; and the malfunction visual signal comprises a specified flashing of the visual indicator of each heating element for which a malfunction was encountered.

In an embodiment, the invention provides that the number of flashes is coded as follows:

a) a single flash for short circuiting of a right rear heating element;

b) two flashes for short circuiting of a right front heating element;

c) three flashes for short circuiting of a left rear heating element;

d) four flashes for short circuiting of a left front heating element;

e) five flashes for a malfunction in the keys associated with the heating elements; and f) six flashes for a malfunction in the power unit.

In an embedment, the invention provides an electric range having a diagnostics system comprising at least one heating element, at least one keypad for entry of data by a user, and a programmable controller system interfacing with the heating element and the keypad, the programmable controller system programmed to:

a) execute a routine upon receipt of a first specified pattern of input signals to the programmable controller:

b) issue an activation audible signal to indicate receipt of the specified pattern of input signals;

c) issue an activation visual signal to indicate receipt of the specified pattern of input signals;

d) test cooktop heating element drivers for malfunction conditions;

e) test cooktop controller input drivers for malfunction conditions;

f) issue a malfunction visual signal to indicate the existence and type of any malfunction condition;

g) terminate the routine upon the receipt of a second specified pattern of input signals to the programmable controller;

h) issue a deactivation visual signal to indicate termination of the routine; and i) issue a deactivation audible signal to indicate termination of the routine.

These and other features of the invention will become clear below with reference to the following detailed description of the presently preferred embodiments with reference to the accompanying drawings.

BRIEF DESCRIPTION OF THE DRAWINGS

FIG. 7 illustrates a flow chart for a diagnostics system implementing the principles of the present invention.

DETAILED DESCRIPTION OF THE PRESENTLY PREFERRED EMBODIMENTS

As discussed above, the present invention provides a service diagnostics arrangement, which includes both the arrangement of hardware for input of commands and output of information and a method for executing the diagnostics.

Figure 1:
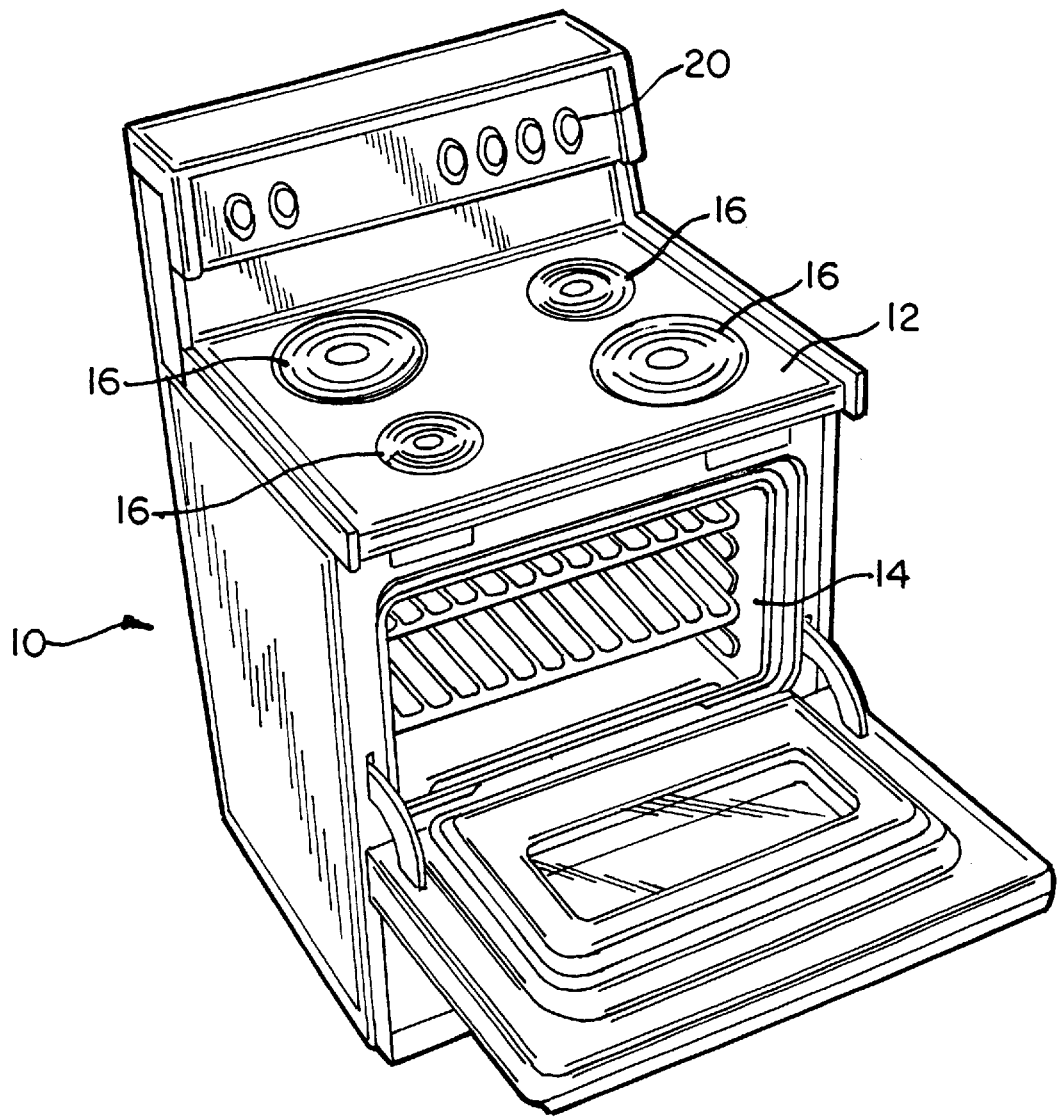
FIG. 1 illustrates an electric range in perspective view.

In FIG. 1 there is illustrated in perspective view an electric range 10 having a cooking top 12 and an oven 14. The cooking top 12 includes various heating elements 16 which could be of any suitable type such as resistive heating elements, quartz heating elements, or the like. The cooking top also includes a set of controls 20 used to control operation of the heating elements 16 by selecting the temperature settings therefor.

Figure 2:
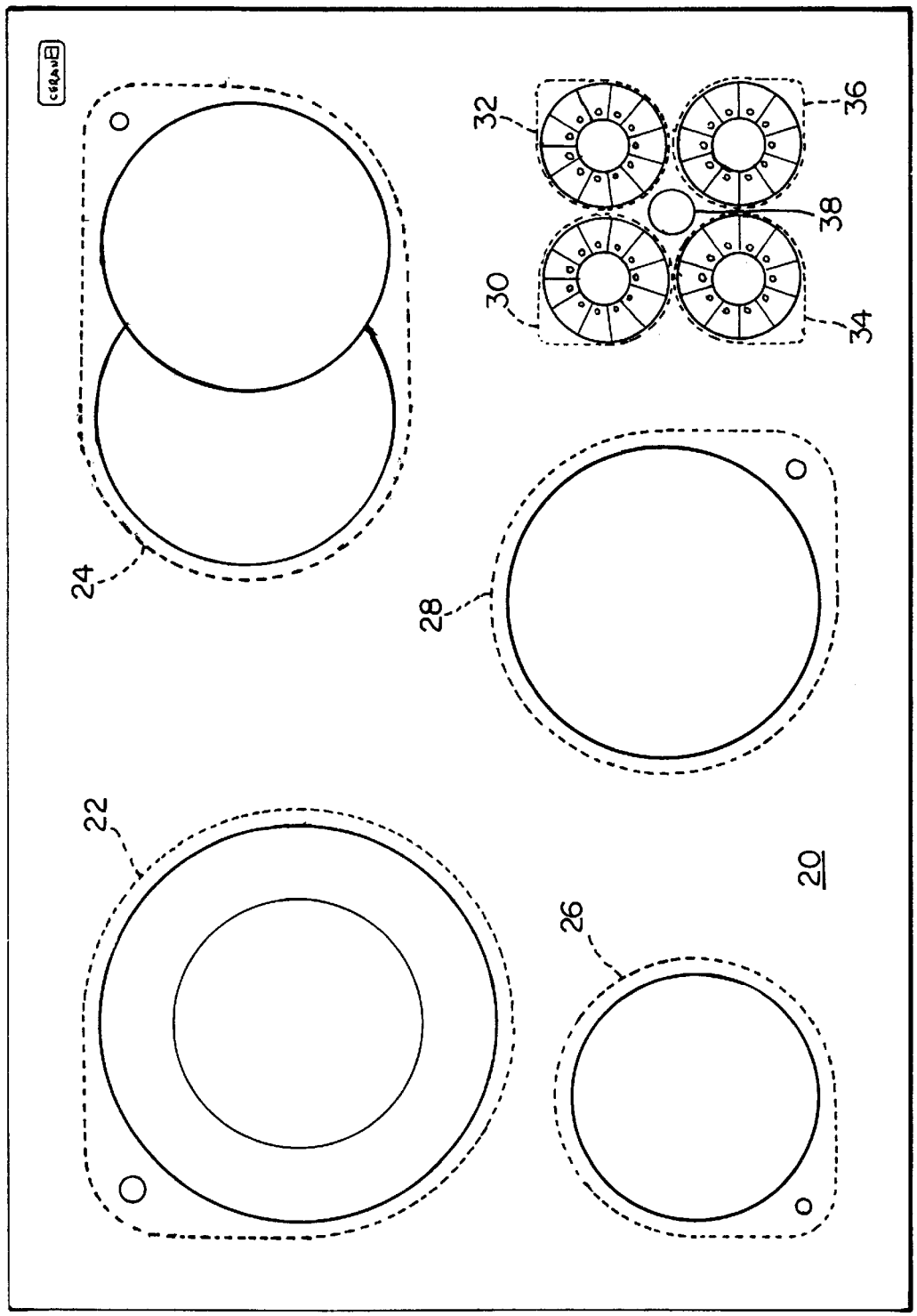
FIG. 2 illustrates in plan view a cooking top with control input section for an electric range.
Figure 3:
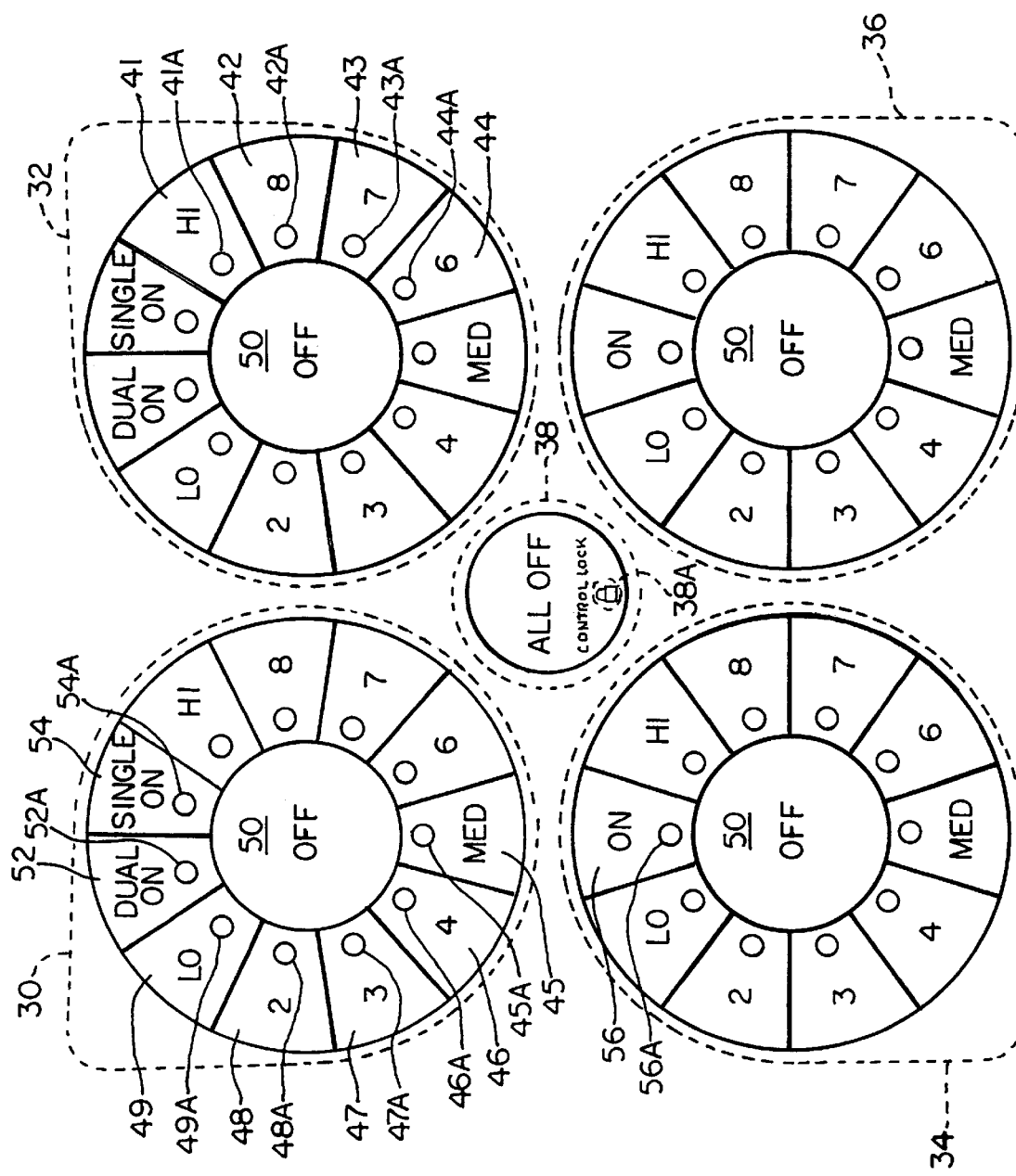
FIG. 3 illustrates in greater detail the control input section for the electric range cooking top of FIG. 2.

With reference now to FIGS. 2 and 3, there is illustrated a cook top 20 having left rear heat element 22, right rear heat element 24, left front heat element 26 and right front heat element 28. Also illustrated are respective control elements for the heat elements 22, 24, 26 and 28. These control elements have a left rear control element 30, right rear control element 32, left front control element 34 and right front control element 36.

An on/off switch element or key, preferably a switch, 38 for shutting off the entire cook top 20 also is provided. A visual signaling device 38A, preferably an light emitting diode (LED), labeled "CONTROL LOCK" is associated with therewith to indicate that the cooktop is in a locked off state, as explained more fully below.

In the illustrated embodiment, each control element comprises a series of 9 temperature setting or selection elements or keys, preferably switches, 41, 42, 43, 44, 45, 46, 47, 48 and 49 denominated HI, 8, 7, 6, MED, 4, 3, 2 and LO, respectively, as well as an "OFF" selection element or key, preferably a switch, 50. The left and right rear control elements each have a selection element or key, preferably a switch, 52 denominated "DUAL ON" for switching on the two heat elements respectively associated with each and a switch element or key, preferably a switch, 54 denominated "SINGLE ON" for switching on one of the two heat elements respectively associated therewith.

Each of the temperature selection elements or keys 41, 42, 43, 44, 45, 46, 47, 48 and 49 has a visual selection signaling device, preferably an LED, associated therewith. To that end, the elements or keys 41, 42, 43, 44, 45, 46, 47, 48 and 49 have LEDs, 41A, 42A, 43A, 44A, 45A, 46A, 47A, 48A and 49A respectively associated therewith. Similarly, the DUAL ON and SINGLE ON selection elements 52 and 54 have visual power on indicators, preferably LEDs, 52A and 54A, associated therewith, respectively. Generally, when a given temperature setting is selected, or the DUAL ON or SINGLE ON setting is selected, the LED associated therewith is caused to be illuminated.

Each of the left and right front control elements has a single switch element or key, preferably a switch, 56 denominated "ON" for switching on the single heat element respectively associated therewith. Similarly, the switch elements 56 have visual power on indicators, preferably LEDs 56A associated therewith to indicate activation of the heating element.

Figure 4:
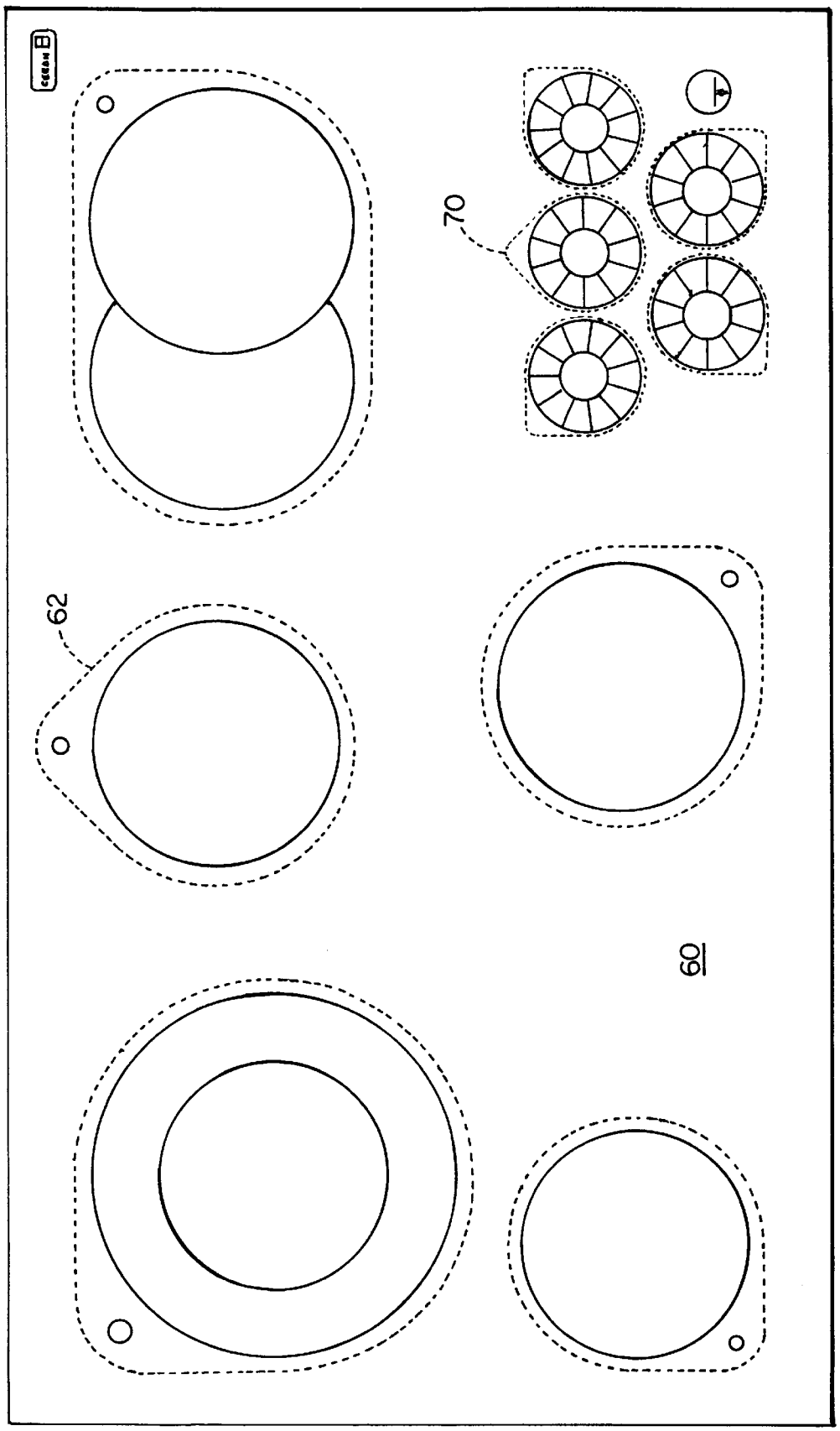
FIG. 4 illustrates in plan view another cooking top of an electric range.
Figure 5:
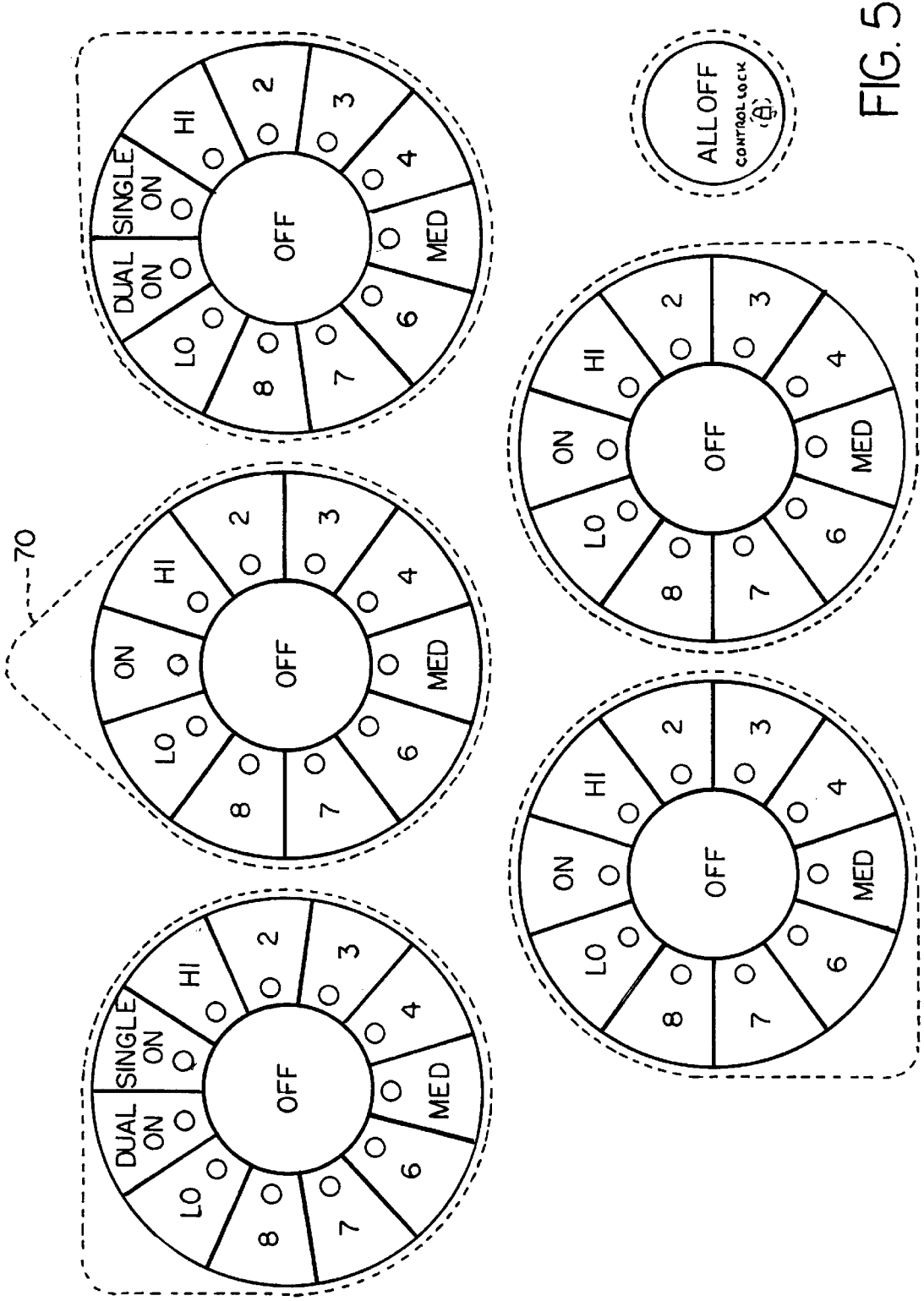
FIG. 5 illustrates the control section for the electric range cooking top of FIG. 4.

A cook top 60 illustrated in FIGS. 4 and 5 is similar to that of FIGS. 2 and 3 but is different in that a fifth singular heat element 62 is included. Additionally, the control elements have been rearranged to accommodate a corresponding control element 70. The control element 70 is identical to the first described control elements 34 and 36, and, therefore, is not further discussed herein.

Figure 6:
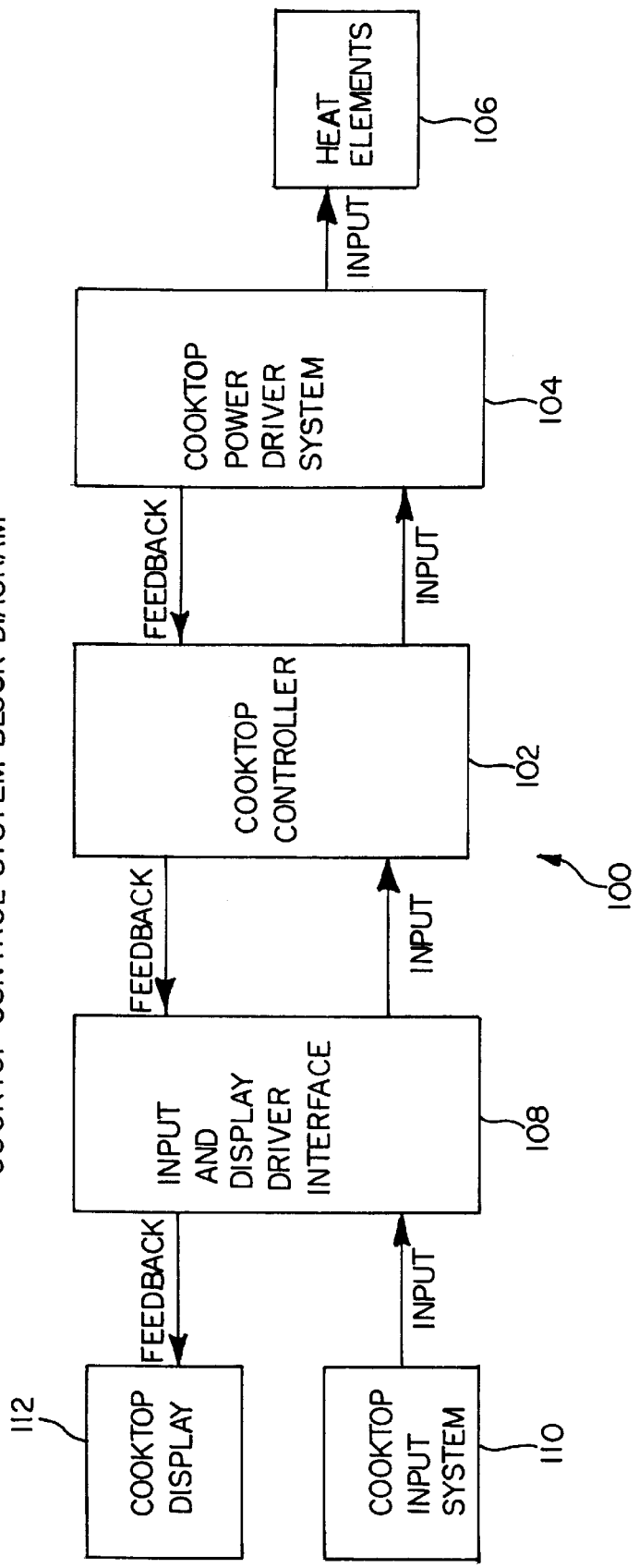
FIG. 6 illustrates in block diagram form a control system for either of the cook tops of FIGS. 2–5.

In FIG. 6, there is illustrated a block diagram for a control system 100 for controlling either of the cook tops 20 and 60. As illustrated, such a control system 100 preferably comprises a controller 102 which provides inputs to appropriate cook top drivers, grouped as the cook top power driver system 104 in FIG. 6. Such inputs could comprise analog or digital electrical signals with temperature selection information. The cooktop power driver system 104 also provides information back to the cooktop controller 102 in the form of feedback signals. Such feedback signals can be in the form of analog or digital electrical signals, and can indicate temperature settings, shorts, open circuits and the like.

The cook top power driver system 104 in turn appropriately drives the heat elements 106 (22, 24, 26 and 28 in FIGS. 2 and 3; 22, 24, 26, 28 and 62 in FIGS. 4 and 5) by turning the selected heat elements on and regulating the temperature settings thereof.

On the other hand, the cooktop controller 106 receives input signals from an input and display driver interface 108 which provides an interface between the cooktop controller 102 and the various keys and signaling devices on a cooktop. In FIG. 6, the various keys of the cooktop control elements are represented by the block labeled cooktop input system 110 while the various signaling devices, such as the LEDs are represented by the block labeled cooktop display 112. As illustrated, the cooktop input system 110 provides input signals to the input and output display driver interface 108 while the cooktop display 112 receives feedback signals from the input and display driver interface 108. To effect the later, the input and output display driver interface also receives feedback signals from the cooktop controller 102.

Again, all of these signals can be in either analog or digital form. However, preferably they are in digital form.

The cooktop controller 102 preferably is programmed to effect many features, some of which relate directly to service diagnostics, others which relate to normal operation of the cooktop. These features are described next.

An "ALL OFF" feature turns off the entire cook top with one input and is activated by pressing the "ALL OFF" key 38.

A "CONTROL LOCK" feature disables the element controls and is activated by pressing and holding the "ALL OFF" key 38 for five (5) seconds. When the cooktop elements are so disabled, the LED 38A provided for indicating this is caused to be illuminated.

An "ON" feature is the first step in the power activation process, which is a two-step process. If the second step is not processed within ten seconds, the start sequence will self-cancel. This feature, having an audible single beep feature, is activated by pressing one of the "ON" keys 56. The LED 56A associated therewith is then illuminated.

The DUAL or SINGLE "ON" feature establishes the element configuration for those heating elements with two elements and is the first step in the power activation process, which is a two-step process activated by pressing either the "DUAL ON" key 52 or "SINGLE ON" key 54 and causes the emission of a single-beep audible tone and the illumination of the LED 52A or 54A, respectively.

A DATA INPUT METHOD function, activated by pressing "HI," "MED," "LO" or any temperature level therebetween for direct setting of a heating element, with direct entry for all nine power level. When a selector is pressed, the LED associated therewith is illuminated to indicate such selection.

An OFF function, activated by the OFF key 50, turns the associated element and its respective control off. At the same time, the associated ON and power level indicators (LEDs) will be turned off.

An AUTOMATIC HOT SURFACE INDICATOR feature is a visual warning that the cooking area above and in close proximity of an element is too hot to touch safely. A LED such as a power level indicator or an ON indicator at the element control will illuminate when the temperature exceeds 65 degrees Celsius and will remain on until the surface has cooled to 65 degrees Celsius.

An AUTOMATIC SHUTOFF feature turns the unit off if the cook top is "ON" and no keypad is pressed for 12 hours. The entire unit is shut down until the appropriate keypads are pressed to activate an element.

A "SABBATH MODE" feature is a special operation Jewish community feature which allows automatic shutoff and disabling of level indicators (LEDs) for each element. This feature is activated by pressing and holding the right rear "OFF" key for 5 seconds. This also produces an audible tone (a single beep) with a flashing visual control lock LED. When the automatic shutoff is disabled, disable level indicators (LEDs) are present for each element. The feature is then deactivated by pressing and holding the right rear "OFF" key for 5 seconds, at which time an audible tone (a single beep) will be issued and the "CONTROL LOCK" LED 38A is turned off.

A MANUFACTURING DIAGNOSTIC is a test conducted during manufacturing to validate the controls and ensure the electrical systems operate properly after installation. This feature is activated by pressing and holding the left rear "6" and "3" keys 44 and 47 for 5 seconds, producing an audible tone (preferably a double beep). All LEDs on the left rear control will visually flash, preferably twice, and at each key press the control will beep, preferably once, and the respective LED will light. The feature is deactivated by pressing and holding the left rear "6" and "3" keys 44 and 47 for 5 seconds, which again produces an audible tone (preferably an double beep). All LEDs on the left rear control will visually flash, preferably twice.

In accordance with the invention, the controller is configured, e.g., via appropriate programming (software, firm ware, etc.) to effect a SERVICE DIAGNOSTIC feature upon appropriate activation of switch elements or keys of the cooktop control panel. In the illustrated embodiment, the controller is configured such that activation of switch elements or keys (e.g., by touching or depressing same, depending on the specific type of switch element used) causes the controller 102 to check for operational errors, such as burned out heat elements, and to signal the occurrence of same.

The SERVICE DIAGNOSTIC feature generally is a test conducted by a service technician during repair of the unit. However, it may be that the service diagnostic could be effected by a consumer.

As mentioned above, the diagnostic will identify faults associated with the controls. This feature preferably is activated by pressing and holding the right rear "7" and "3" keys 48 and 44 for 5 seconds, producing an audible tone, preferably a double beep. Simultaneously or shortly thereafter, all LEDs on the right rear control will visually flash, preferably twice. The audible and visual signals are used to signal activation of the diagnostics system. The controller 102 then conducts an internal diagnostic of the input and display driver interface 108 and the cooktop power driver system 104, identifying faults of the system (i.e., shorts and open circuits). Individual heating element controls preferably identify failures by flashing their respective power level LED in a coded fashion for faults, such as: 1) element shorted, 2) element open circuit, 3) no response from keys, etc. The diagnostic system is deactivated by pressing and holding the right rear "7" and "3" keys 44 and 47 for 5 seconds. Deactivation is then indicated or signaled by an audible tone (preferably a double beep) and causing all LEDs on the right rear heating element control to flash, preferably twice.

In FIG. 7, the scheme for a service diagnostics for electronic cooktops is illustrated. As illustrated, in a preferred embodiment, the service diagnostics system is activated by actuating preselected keys in a step 200. In the illustrated embodiment, one who wishes to activate the system presses and holds for 5 seconds, temperature selection keys designated "3" and "7" of the right rear heating element control. At that time, the system issues an audible signal to indicate that the system is activated. Alternatively or simultaneously, the system can cause a visual indication to be activated. Such a visual indication can indicated that the "hidden features" of the cooktop are activated.

Once the routine has cycled through its various steps, the cooktop controls will be activated to queried to identify any faults within the system (e.g. shorts and open circuits through measurement or currents and voltages within the system). Individual heating element controls are then activated to indicate whatever status the diagnostics system encounters.

In one embodiment, the individual heating element controls would be activated to identify failures by flashing their respective power level selection LED. For example, the following power level selection LED indicating scheme could be used:

| | |
|---|---|
| LO | element shorted; |
| 2 | element open circuited; |
| 3 | no response from keypad; |
| 4 | power unit failure; and |
| MED | controls error. |

As illustrated, in step 202, one or more control lights associated with the heating elements are activated thereby to provide the visual status signaling.

As also illustrated, the visual signaling can also be effected in such a manner to provide special codes that provide more detailed information. In that regard, if the indicator is caused to flash in a given manner the number of flashes can be used to provide specific information. In this system, the person running the diagnostics system counts the number of consecutive flashes to determine the indicated fault In FIG. 7, a constant flash 204 (herein also referred to as 1 time or 1x) is used to indicate that the right rear heating element is shorted. A series of two flashes 206 (herein also referred to as 2 times or 2x) is used to indicate that the right front heating element is shorted. A series of three flashes 208 (herein also referred to as 3 times or 3x) is used to indicated that the left rear heating element is shorted. A series of four flashes 210 (herein also referred to as 4 times or 4x) is used to indicate the left front heating element is shorted. A series of five flashes 212 (herein also referred to as five times or 5x) is used to indicate that the keypad is defective. A series of 6 flashes 214 (herein also referred to as six times or 6x) is used to indicate a failure in the power unit. A series of seven flashes 216 (herein also referred to as seven times or 7x) can be used to indicate other failures or problems, for example, failures in the diagnostic system itself or failures in the controls.

The diagnostic system preferably is deactivated in the same manner as it is activated, namely by pressing for 5 seconds the "3" and "7" keys 44 and 47 associated with the right rear heating element. Upon deactivation, the system issues an audible signal, preferably in the form of two beeps and a visual signal, preferably in the form of activation for a short period or flashing activation of all lights associated with a heating element, e.g. the right rear heating element.

The advantages of such a diagnostic system are many. Such a system would help reduce the time required to identify faults or malfunctions. Moreover, the diagnostic system could be operated by a user who could then report the fault to a service technician.

Additionally, the diagnosis with such a system is highly efficient and can be used to increase quality control during manufacture of an appliance.

INVALID KEYS is a feature that causes the emission of an audible tone, preferably a double beep, when an invalid key is pressed. The following constitutes an invalid key entry:

A) Pressing an "ON" key when the associated heating element control is already active.

B) Pressing 2 keys within the same heating element control simultaneously.

A MULTIPLE CUSTOMER INTERFACE (Keypad Sensing) feature includes the keypad functions for the power "ON" indicator for each heating element (either "ON," "DUAL ON," "SINGLE ON"), the power "OFF" for each heating element, and all nine (9) power levels (LO, 2, 3, 4, MED, 6, 7, 8 and HI) for each heating element, and the OFF and CONTROL LOCK keys. The types of technology for implementing such keys include:

1) A Field Sensing keypad mechanization, "Sens-A-Touch", by Integrated Controls Technology (ICT), can be used to interface the user with the controls unit (activated through a ceran cover).

2) Switch on steel (forced resistance).

3) Remote.

4) Detached. This interface feature should function at 105° C. by affixing a sensing layout on the circuit board with Sens-A-Touch interface circuitry and pressing (hold) the sensing layout against the ceran, and utilizing standard application tests, TCP-172.

The LEDs should operate at 105° C. for displays within the control area and are illuminated one-by-one in 50ms. increments from LO to the selected power level.

A PARALLAX feature is a display which is constructed so that the upper most segments remain visible when viewed at an angle in accordance with the U.L. 858A requirement for visibility of the "ON" LEDs.

The AUDIBLE OUTPUT SYSTEMS feature emits an audible signal −1953 Hz ± 1% at 25° C. signal, reaching 105° C. for displays within the control area and having a Peizo type buzzer audible from 20 feet.

A PAN SENSING feature indicates the presence of any type of cooking utensil over an element (examples: aluminum, glass, steel, clad, enameled, copper, etc.). A temperature of 600° C. is required for components in the element area. If the (Auto) element is "ON" and no pan is present, a light (s) will flash immediately and an audible signal will be heard after 20 seconds.

POWER DELIVERY SYSTEMS (HEATING ELEMENTS) preferably are as follows:

Radiant:
Single element 1400W, 1700W, 2100W, 2400W
Dual element 2400W: 1000W inner, 1400W outer
Dual element 2200W: 1440W inner, 800W outer Halogen:
Single element 1500W, 1800W, 2100W, 2400W Dual element 2400W: 1000W inner, 1400W outer
Dual element 2200W: 1400W inner, 800W outer Current carrying capabilities (amperes @ 208v–265v) for radiant elements preferably are as follows:

| Radiant: | single - 5.28 min./11.54 max. |
| --- | --- |
|  | dual - 3.02 min./11.54 max. |
| Halogen | single - 5.66 min./11.54 max. |
|  | dual - 3.02 min./11.54 max. |

However, special consideration are needed for inrush current. In that regard, the wattage delivered by each heating element, before heat up and after heat up preferably is equal, regardless of the order in which the settings were selected.

The POWER INTERRUPTION feature is a control which must withstand a power interruption of up to 3 seconds without loss of programmed memory and resume its current operations, at 240 VAC. The display is not required to remain on, or relays pulled in during a power interruption. When power is restored after memory loss, the Controls will power-up in the "OFF" condition. Safe and proper power-up must occur regardless of the time rate at which line voltage increases when power is restored.

A CAPACITIVE LEAKAGE feature ensures that the control system and any associated line filter shall not cause more than 5 ma. capacitive leakage when tested per U.L. 858, Section 17.

A power supply control must operate reliably over a line voltage of 208–265 VAC. The nominal rating is 240 VAC. (The control must have the capability of using a 50/60 Hz 240 VAC transformer.) This is an adaptable algorithm to deliver the same wattage over the voltage range (208V–265V).

A HI-POT TEST feature ensures that the control system and any associated line filter shall withstand a HI-POT test of 1080 Volts, applied instantly, and held for one second or the applied potential shall be increased gradually from 0–900 volts (approximately 5–10 seconds) and held for one minute with all controls set in a position to apply potential to all possible circuits. It should be noted that more than one setting may be necessary to check all circuits.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim as our invention:

1. A cooktop service diagnostics method which is effected by a programmable controller system, wherein the programmable controller:
   a) executes a routine upon receipt of a first specified pattern of input signals selectively input by the cooktop operator to the programmable controller;
   b) issues an activation audible signal to indicate receipt of the specified pattern of input signals;
   c) issues an activation visual signal to indicate receipt of the specified pattern of input signals;
   d) tests a plurality of cooktop heating element drivers for malfunction conditions;
   e) tests a plurality of cooktop controller input drivers for malfunction conditions;
   f) issues a malfunction visual signal to indicate the existence and type of any malfunction condition;
   g) terminates the routine upon the receipt of a second specified pattern of input signals selectively input by the cooktop operator to the programmable controller;
   h) issues a deactivation visual signal to indicate termination of the routine; and
   i) issues a deactivation audible signal to indicate termination of the routine.

2. The method of claim 1, wherein the cooktop has at least one heating element with a controller associated therewith, the heating element controller having a plurality of temperature selection keys associated therewith; and the first specified pattern comprises the actuation for a specified time period of two temperature selection keys associated with the heating element.

3. The method of claim 2, wherein the specified time period is at least 5 seconds.

4. The method of either claim 1, 2 or 3, wherein the second specified pattern comprising the actuation for a predetermined period of two temperature selection keys associated with the heating element.

5. The method of claim 4, wherein the predetermined period is at least 5 seconds.

6. The method of claim 5, wherein the first and second patterns of input signals are identical.

7. The method of claim 1, wherein the activation and deactivation audible signals comprise two beeps.

8. The method of claim 1, wherein the heating element controller also includes a visual indicator to indicate that the heating element is on; and the malfunction visual signal comprises a specified flashing of the visual indicator which indicates that the heating element is on, the number of flashes being a code to indicate the type of malfunction encountered during the testing steps.

9. The method of claim 8, wherein the cooktop has a plurality of heating elements with a like plurality of respective heating element controllers; and the malfunction visual signal comprises a specified flashing of the visual indicator of each heating element for which a malfunction was encountered.

10. The method of claim 8, wherein the heating element controller includes a plurality of visual temperature setting indicators; and the malfunction visual signal comprises an illumination of a specified one of said plurality of visual temperature setting indicators.

11. The method of claim 8, wherein the cooktop has a plurality of heating element controllers, each heating element controller having a plurality of visual temperature setting indicators; and the malfunction visual signal comprises illumination of a specified one of said plurality of visual temperature setting indicator for each heating element for which a malfunction was encountered.

12. The method of claim 8 or 9, wherein the number of flashes is coded as follows:
    a) a single flash for short circuiting of a right rear heating element;
    b) two flashes for short circuiting of a right front heating element;
    c) three flashes for short circuiting of a left rear heating element;
    d) four flashes for short circuiting of a left front heating element;

e) five flashes for a malfunction in the keys associated with the heating elements; and f) six flashes for a malfunction in the power unit.

13. An electric range having a diagnostics system comprising:

at least one heating element;

at least one heating element driver associated with the at least one heating element;

at least one keypad for entry of data by a user;

at least one input driver associated with the at least one keypad; and a programmable controller system interfacing with the at least one heating element driver and the at least one input driver, the programmable controller system programmed to:

a) execute a routine upon receipt of a first specified pattern of input signals selectively input by the cooktop user to the programmable controller;

b) issue an activation audible signal to indicate receipt of the specified pattern of input signals;

c) issue an activation visual signal to indicate receipt of the specified pattern of input signals;

d) test said at least one cooktop heating element driver for malfunction conditions;

e) test said at least one cooktop controller input drivers for malfunction conditions;

f) issue a malfunction visual signal to indicate the existence and type of any malfunction condition;

g) terminate the routine upon the receipt of a second specified pattern of input signals selectively input by the cooktop user to the programmable controller;

h) issue a deactivation visual signal to indicate termination of the routine; and i) issue a deactivation audible signal to indicate termination of the routine.

14. The electric range of claim 13, wherein the cooktop has a plurality of temperature selection keys; and the first specified pattern comprises the actuation for a specified time period of two temperature selection keys associated with the heating element.

15. The electric range of claim 14, wherein the specified time period is at least 5 seconds.

16. The electric range of either claim 13, 14 or 15, wherein the second specified pattern comprising the actuation for a predetermined period of two temperature selection keys associated with the heating element.

17. The electric range of claim 16, wherein the predetermined period is at least 5 seconds.

18. The electric range of claim 17, wherein the first and second patterns of input signals are identical.

19. The electric range of claim 13, wherein the activation and deactivation audible signals comprise two beeps.

20. The electric range of claim 13, wherein the heating element controller also includes a visual indicator to indicate that the heating element is on; and the malfunction visual signal comprises a specified flashing of the visual indicator which indicates that the heating element is on, the number of flashes being a code to indicate the type of malfunction encountered during the testing steps.

21. The electric range of claim 20, wherein the cooktop has a plurality of heating elements with a like plurality of respective heating element controllers; and the malfunction visual signal comprises a specified flashing of the visual indicator of each heating element for which a malfunction was encountered.

22. The method of claim 20, wherein the element controller includes a plurality of visual temperature setting indicators; and the malfunction visual signal comprises an illumination of a specified one of said plurality of visual temperature setting indicators.

23. The method of claim 20, wherein the cooktop has a plurality of heating elements with a like plurality of respective heating element controllers; and the malfunction visual signal comprises a specified flashing of the visual indicator of each heating element for which a malfunction was encountered.

24. The electric range of claim 20 or 21, wherein the number of flashes is coded as follows:

a) a single flash for short circuiting of a right rear heating element;

b) two flashes for short circuiting of a right front heating element;

c) three flashes for short circuiting of a left rear heating element;

d) four flashes for short circuiting of a left front heating element;

e) five flashes for a malfunction in the keys associated with the heating elements; and f) six flashes for a malfunction in the power unit.

25. A service diagnostic system which comprises:

a cooktop power driver system which operatively drives a plurality of cooktop heating elements, an output and display driver interface which is operatively coupled to a cooktop display and a cooktop keypad; and a programmable controller coupled between the input and display driver interface and the cooktop power driver system for communication input signals thereto and receiving feedback signals therefrom, said programmable controller programmed to:

a) execute a routine upon receipt of a first specified pattern of input signals selectively input by the cooktop operator to the programmable controller;

b) issue an activation audible signal to indicate receipt of the specified pattern of input signals;

c) issue an activation visual signal to indicate receipt of the specified pattern of input signals;

d) test said cooktop power driver system for malfunction conditions;

e) test said output and display interface for malfunction conditions;

f) issue a malfunction visual signal to indicate the existence and type of any malfunction condition;

g) terminate the routine upon the receipt of a second specified pattern of input signals selectively input by the cooktop operator to the programmable controller;

h) issue a deactivation visual signal to indicate termination of the routine; and i) issue a deactivation audible signal to indicate termination of the routine.

26. The system of claim 25, wherein the cooktop keypad has a plurality of temperature selection keys; and the first specified pattern comprises the actuation for a specified time period of two temperature selection keys associated with a heating element.

27. The system of claim 25, wherein the specified time period is at least 5 seconds.

28. The system of either claim 25, 26 or 27, wherein the second specified pattern comprising the actuation for a predetermined period of two temperature selection keys associated with a heating element.

29. The system of claim 28, wherein the predetermined period is at least 5 seconds.

30. The system of claim 29, wherein the first and second patterns of input signals are identical.

31. The system of claim 25, wherein the activation and deactivation audible signals comprise two beeps.

32. The system of claim 25, wherein the cooktop display also includes a visual indicator to indicate that a heating element is on; and the malfunction visual signal comprises a specified flashing of the visual indicator which indicates that the heating element is on, the number of flashes being a code to indicate the type of malfunction encountered during the testing steps.

33. The system of claim 32, wherein the cooktop has a plurality of heating elements and the cooktop keypad has a like plurality of respective heating element control keys associated with each; and the malfunction visual signal comprises a specified flashing of the visual indicator of each heating element for which a malfunction was encountered.

34. The system of claim 32, wherein the cooktop keypad includes a plurality of visual temperature setting indicators; and the malfunction visual signal comprises an illumination of a specified one of said plurality of visual temperature setting indicators.

* * * * *